May 14, 1963 E. WIEDEMANN 3,089,969
COOLING ARRANGEMENT FOR TURBOGENERATORS
Filed Oct. 15, 1956
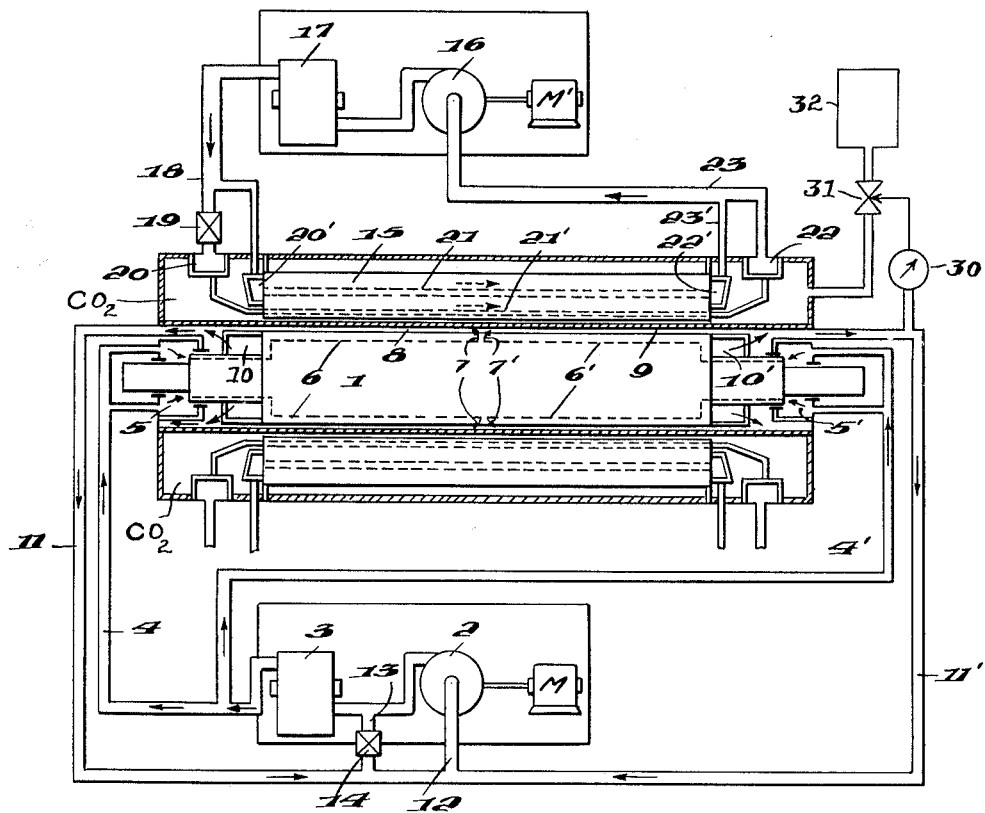
INVENTOR
Eugen Wiedemann
BY Pierre, Scheffler & Parker
ATTORNEYS

United States Patent Office 3,089,969
Patented May 14, 1963

3,089,969
COOLING ARRANGEMENT FOR
TURBOGENERATORS
Eugen Wiedemann, Hasel, Spreitenbach, Switzerland, assignor to Aktiengesellschaft Brown, Boveri & Cie, Baden, Switzerland, a joint-stock company
Filed Oct. 15, 1956, Ser. No. 615,889
Claims priority, application Switzerland Oct. 15, 1955
3 Claims. (Cl. 310—53)

This invention relates to electrical turbo-generators and more particularly to an improved arrangement for cooling the same.

As has long been appreciated, a most effective cooling system for turbo-generators is essential since the electrical output of the machine is limited substantially entirely by the permissible temperature rise within the machine. The flow of current through the machine results in the creation of heat within the same, and the better one is able to conduct this heat away as it is formed the higher will be the maximum output capacity of the machine.

It is already known to provide turbo-generators with one cooling system for the rotor element and another cooling system for the stator element. The two systems are maintained separately from one another and each is of the closed re-circulation path type. Cooling of the rotor is most times effected by circulating hydrogen on the surface of the rotor and also by conducting the hydrogen through cooling ducts which extend axially within the body of the rotor and through the slots in the rotor in which the rotor windings are received. The space occupied by the rotor is sealed off from the space occupied by the surrounding stator element and hence makes it possible to utilize a liquid, preferably oil, for cooling of the stator element and the winding placed therein. This oil coolant is pumped through ducts which extend axially through the laminated sheet packings which form the stator iron structure, these ducts being located close to the stator windings, and the oil coolant may also be pumped through the stator windings themselves when the latter are constituted by tubular electrical conductors. The heat picked up by the oil coolant in the stator is removed by passing the hot oil through a heat exchange device which may be located either inside or outside of the generator house. Moreover, the axially extending cooling ducts within the stator can communicate with radially extending ducts therein so as to enhance the cooling effect, the oil passing radially and flowing between the stator laminations to the stator space where it is led off to be cooled and recirculated.

If the stator space or casing is provided with an oil or hydrogen filling there result certain serious disadvantages. Considering the extensive dimensions of turbo-generators it is thus necessary to provide for very large quantities of oil to fill the casing. On the other hand, if hydrogen is utilized as a filling for the stator casing, the oil used for cooling of the stator itself gradually becomes saturated with hydrogen thus necessitating periodic cleaning of the oil so as to remove the hydrogen. Moreover, use of a combustible filling, such as hydrogen, in the stator casing increases the danger of fire and explosions should the casing develop any leaks to the exterior.

The object of the present invention is to provide an improved cooling system for turbo-generators of the type wherein the rotor space is sealed in a gas tight manner from the stator space and from the surrounding air externally of the machine and wherein the rotor and stator elements are cooled by the circulation of gas and fluid coolants therethrough respectively in closed circulation systems, the objective being attained by filling the closed space occupied by the stator element with an incombustible gas. Carbon dioxide or air have each been found to be satisfactory. The use of such an incombustible gas eliminates the disadvantages described above in relation to the use of oil or hydrogen as the filling media, and also the stator casing no longer has to be made with such a high degree of skill as regards its ability to prevent the transfer of gas from the interior to the exterior thereof.

A further improvement is effected when, according to the invention, the pressure of the incombustible gas filling in the stator casing is regulated to equal the pressure of the hydrogen cooling gas circulating through the rotor space. With this arrangement the gas pressure in the stator casing or space is constantly adapted to the gas pressure in the rotor space so that the cylindrical sleeve separating the two spaces, in part, from each other, does not require mechanically perfect separating ability. Also the balance in gas pressures in the rotor and stator spaces exhibits a favorable effect on the mutual sealing of both spaces.

In general, the gas pressure in the rotor space will be higher than atmospheric so that the pressure of the gas filling in the stator space is correspondingly increased. However, it is possible to operate the turbo-generator with a pressure lower than atmospheric in the rotor space in order to reduce the losses incurred through friction. In this situation, the pressure of the gas filling the stator space is correspondingly reduced. Regulation of the gas pressure in the stator space can be effected either in a manual manner or automatically by means of control devices responsive to changes in gas pressure.

One practical arrangement according to the present invention is illustrated in the accompanying drawing the single FIGURE of which shows a somewhat schematic layout of the stator and rotor elements of a turbo-generator with closed and separate coolant circulation systems for such elements.

With reference now to the drawing, the rotor element of the turbo-generator is designated by numeral 1. The cooling system for rotor 1 is of the closed re-circulation type and comprises an electric motor M driving a blower 2 which forces the cooling gas such as hydrogen through a heat exchanger 3 where it is cooled and thence through ducts 4, 4' to annular chambers 5, 5' at opposite ends of the rotor. From the chambers 5, 5', the gaseous coolant flows in opposite directions through axially located channels or passageways 6, 6' in the rotor near the rotor windings, the coolant being taken out of the rotor at the central portion thereof by means of radially extending passageways 7, 7' and then passed backwardly along the rotor to the opposite ends thereof in the air gap 8 between the rotor surface and the interior wall of the cylindrical tube 9 of insulating material which separates the rotor space from the stator space in the machine, the return gaseous coolant being collected in annular chambers 10, 10' at opposite ends of the rotor and then being returned via ducts 11, 11' to the intake duct 12 at the blower 2. As a safety measure, the blower 2 is provided with a by-pass duct 13 and in which is located an over-pressure valve 14 to the end that should the blower fail, valve 14 will then open and permit circulation of the hydrogen gas through the rotor by the pumping effect inherent in the rotating rotor itself.

The conductors forming the stator winding, and the laminated iron structure of the stator 15 are cooled by means of a liquid, preferably oil, which is circulated through the stator in a closed re-circulation system. The oil coolant passes from a pump 16 driven by a motor M' through a heat exchange device 17 where it is cooled and thence from the latter through duct 18 and throttle valve 19 into annular chamber 20 and into annular chamber 20' located at one end of the stator. The oil coolant then passes from chambers 20, 20' through axially extending passageways 21, 21' in the stator iron itself, and also the electrical conductors themselves which form the stator winding if such conductors are tubular. The oil passageways 21, 21' connect with annular chambers 22, 22' at the opposite end of the stator structure, and the heated oil passes from chambers 22, 22' through return ducts 23, 23' to the intake of pump 16 for cooling and recirculation. The function of the throttling valve 19 is to regulate the pressure drop of the oil coolant as it passes through the axial passageways in the stator so as to be in contact with the electrical conductors in the stator or as it passes through the conductors themselves when the conductors are of tubular form. In accordance with the invention, the stator space is filled with an incombustible gas such as carbon dioxide or air. Also, means are provided to regulate the pressure of the gas filling so as to equal the pressure of the gaseous cooling medium circulated through the rotor and in the rotor space. These means comprise for instance a pressure measuring and control device 30 which in response to a change in pressure in the rotor cooling system automatically actuates a pressure reducing valve 31 and thus regulates the supply of incombustible gas from tank 32.

I claim:

1. In a cooling system for turbo-generators, the combination comprising means sealing a closed space occupied by the rotor element of the turbo-generator from a closed space occupied by the stator element of the turbo-generator and from the surrounding air, means providing a closed re-circulation system for circulating a cooling gas through the rotor element, means providing a closed re-circulation system for circulating a cooling liquid through the stator element, said closed space occupied by the stator element being filled with an incombustible gas and said filling of incombustible gas being entirely separate from the cooling liquid of the stator cooling system, and means for regulating the pressure of the gas filling in the space occupied by the stator element to maintain said pressure equal to the pressure of the cooling gas circulating through the rotor element.

2. A cooling system as defined in claim 1 wherein the means for regulating the pressure of said gas filling for the space occupied by said stator element is controlled manually.

3. A cooling system as defined in claim 1 wherein the means for regulating the pressure of said gas filling for the space occupied by said stator element is controlled automatically in response to pressure changes in the gaseous coolant circulating in the space occupied by said rotor element.

References Cited in the file of this patent

UNITED STATES PATENTS

| | | |
|---|---|---|
| 1,522,333 | Schroeder | Jan. 6, 1925 |
| 1,543,502 | Hobart | June 23, 1925 |
| 1,657,550 | Saathoff | Jan. 31, 1928 |
| 1,686,027 | Newbury | Oct. 2, 1928 |
| 2,675,493 | Grobel | Apr. 13, 1954 |
| 2,687,695 | Blom | Aug. 31, 1954 |
| 2,727,161 | Kilner | Dec. 13, 1955 |

FOREIGN PATENTS

| | | |
|---|---|---|
| 657,880 | Germany | Mar. 16, 1938 |
| 896,086 | Germany | Nov. 9, 1953 |